Feb. 24, 1970  M. R. FARMER ET AL  3,497,171
MEANS FOR SUPPORTING ELECTRICAL DEVICES
Filed March 8, 1968  2 Sheets-Sheet 1

INVENTORS,
MARION R. FARMER
CHARLES E. GARNER
BY

Feb. 24, 1970    M. R. FARMER ET AL    3,497,171
MEANS FOR SUPPORTING ELECTRICAL DEVICES
Filed March 8, 1968                    2 Sheets-Sheet 2

INVENTORS,
MARION R. FARMER
CHARLES E. GARNER
BY Weatherford & Weatherford
attys

United States Patent Office 3,497,171
Patented Feb. 24, 1970

3,497,171
MEANS FOR SUPPORTING ELECTRICAL DEVICES
Marion R. Farmer and Charles E. Garner, Memphis, Tenn., assignors to Utility Products Manufacturing Co., Memphis, Tenn., a corporation of Tennessee
Filed Mar. 8, 1968, Ser. No. 711,627
Int. Cl. F16m 13/02
U.S. Cl. 248—221                                           7 Claims

ABSTRACT OF THE DISCLOSURE

A multi-winged platform fixture adapted for attachment to a utility pole, having interconecting adjustable straps to maintain the wings in radial spaced alinement and bolts carried by the wings to hold and support lightning arrestors, cut-outs or pot heads thereupon, spaced away from the utility pole.

BACKGROUND OF THE INVENTION

Field of the invention

The present invention relates to means for supporting electrical devices and related equipment upon a utility pole, and more particularly to a platform mount for supporting lightning arrestors and like devices adapted for disengageable attachment with a conventional utility pole. The present invention further relates to electrical equipment mounting fixtures provided with adjustable strap means to facilitate the attachment of the fixture upon utility poles having dissimilar diameters and thicknesses.

DESCRIPTION OF THE PRIOR ART

There have been numerous prior devices adapted for supporting electrical equipment on a utility pole, but these prior devices have been designed with bracket and mounting means adapted to primary support electrical transformers. These prior devices have additionally been relatively cumbersome, difficult to attach to the utility pole, and provided with non-interchangeable elements in the overall structure. These prior devices have further comprised elements within their structures rigidly and inflexibly interconnected, producing increased susceptability to torsional stresses acting on these structures when mounted on utility poles.

SUMMARY OF THE INVENTION

The present invention is designed to provide efficient structural means for supporting electrical devices upon a utility pole.

The present invention further provides means for supporting electrical devices in spaced relation on a platform mounted upon a utility pole.

The present invention additionally provides detachable lock means to hold the structural elements of an electrical device supporting means in fixed spaced relation.

OBJECTS OF THE INVENTION

The principal object of the present invention is to provide supporting means for electrical devices mounted on a utility pole.

Another object of the present invention is to provide means to support lightning arrestors and like devices upon a utility pole.

A further object of the present invention is to provide support means for a plurality of lightning arrestors adapted for mounting upon a utility pole.

Another object of the present invention is to provide detachable locking means for the several elements comprising a lightning arrestor support.

A further object of the present invention is to provide a lightning arrestor support having adjustable interconnecting strap means; and Another object of the present invention is to generally improve the design, construction and efficiency of supporting means for lightning arrestors.

DESCRIPTION OF THE DRAWINGS

The means by which the foregoing and the other objects of the present invention are accomplished and the manner of their accomplishment will be readily understood from the following specification upon reference to the accompanying drawings, in which.

DESCRIPTION OF THE PREFERRED EMBODIMENT

Figure 1:
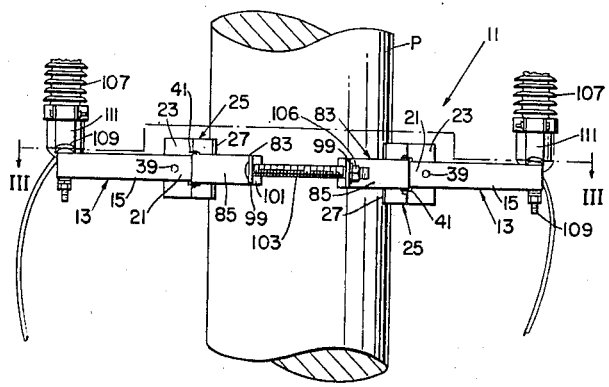
FIG. 1 is a fragmentary front elevational view of the present invention attached to a utility pole.
Figure 3:
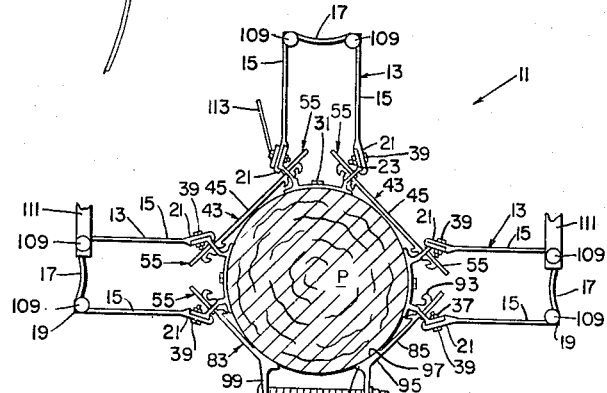
FIG. 3 is a cross sectional plan view of the device of FIG. 1 as taken on the line III—III of FIG. 1.
Figure 2:
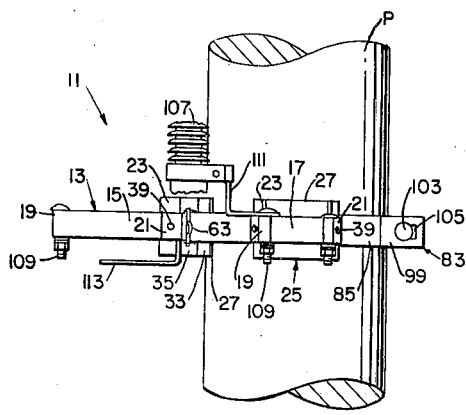
FIG. 2 is a fragmentary side elevational view of the device of FIG. 1.
Figure 4:
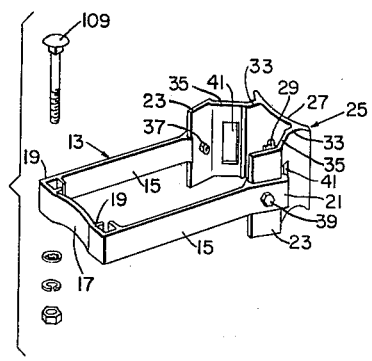
FIG. 4 is an enlarged exploded perspective view of one of the suport means of the device of FIG. 1.

Referring now to the drawings in which the various parts are indicated by numerals, the present invention comprises an electrical equipment support 11 provided with a plurality of substantially rectangularly shaped brackets 13. Each of the brackets 13 comprises a pair of elongated substantially parallel spaced apart legs 15, an arcuately defined end member 17 interposed between and interconnecting the outward ends of the legs 15, bolt supporting means 19 attached to the opposite ends of the arcuate end member 17, extending from the end member 17 into rigid engagement adjacent to the outward ends of the legs 15. Each of the brackets 13 is further provided with a pair of substantially C-shaped foot members 21 integrally connected to the innermost ends of the legs 15 extending angularly outwardly therefrom into substantial overlying engagement with the distal ends 23 of an anchor plate 25. The anchor plate 25 is provided with a substantially arcuate spine portion 27, best illustrated in FIG. 4 of the drawings, having an irregular aperture 29 therein for suspendably affixing the anchor plate 25 upon the bolt 31 carried by the utility pole P. The anchor plate 25 is provided with a pair of oppositely spaced, substantially parallel intermediate rib members 33 attached at one of their ends to the outwardly curved surface of the spine 27 spaced some-what inwardly from the ends thereof and extending outwardly therefrom into substantially rigid engagement at their opposite ends with the tie members 35.

Figure 8:
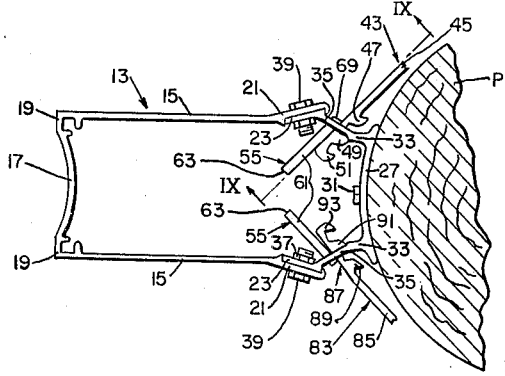
FIG. 8 is an enlarged fragmentary plan view of the device of FIG. 4.

It will thus be readily seen upon reference to the drawings, and more particularly to FIG. 8 of the drawings, that the tie members 35 interconnected between the rib members 33 and the distal ends 23 of the anchor plate 25 provide a substantially unitary structure having its rigidity further enhanced by the fasteners 37 and the bolt means 39 maintaining the foot members 21 of the bracket 13 and the distal ends 23 of the plate 25 in substantially fixed abutment. Each of the tie members 35 of the anchor plates 25 is provided with a substantially rectangular slot 41.

Figure 5:
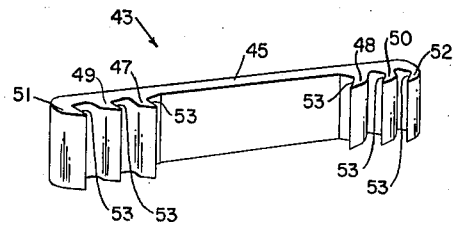
FIG. 5 is an enlarged perspective view of one of the strap means of the device of FIG. 1.

The present invention is provided with a plurality of strap means 43 preferably formed of a suitable aluminum alloy extrusion, as best illustrated in FIG. 5 of the accompanying drawings. The strap means 43 comprise a substantially flat central portion 45. At each of its opposite ends the strap 43 is provided with a plurality of spaced teeth 47, 48, 49, 50, 51, 52. Thus the strap 43 is provided at its ends with endmost teeth 51, 52, and the respective sets of teeth include proximate teeth 47, 48, and each set preferably includes an additional intermediate tooth such as the teeth 49, 50. The strap means 43 are adapted for sliding engagement with the slots 41 carried by the members 35, and it will be readily observed upon reference to the drawings that the strap means 43 are further adapted for spanning between a pair of the brackets 13 to linkably connect the pair of brackets 13 in substantially perpendicularly spaced relation. The straps 43 are positioned in the slots 41 in such manner as to urge the angular faces 53 carried by the teeth 47, 48, 49, 50, 51, 52 into firm adjacency with the innermost vertical side of the slot 41. The straps 43 may further be positioned by selectively engaging the oppositely similar teeth of the straps 43 with a pair of perpendicularly juxtaposed slots 41. The longitudinally opposite similar teeth, such as 47, 48, 49, 50, or 51, 52 are maintained in relatively stable locked condition as by the disengageable sinuous locking clips 55 inserted in the slots 41 interposed between the center section 45 of the strap means 43 and the upstanding side of the slot 41 opposite the side of the slot engaged by a selected one of the teeth.

The clip 55 comprises a substantially U-shaped body portion 57 provided with a pair of oppositely spaced legs 59, 61 and a bight 63. The distal end of the leg 61 is provided with a flange 65 attached at one of its ends thereto and extending inwardly therefrom, an upstanding web 67 connected to the opposite end of the flange 65 inwardly of the leg 61 and an upper flange portion 69 attached to the uppermost end of the web 67 and extending outwardly therefrom in substantially parallel spaced relation with the lower flange 65 to form a saddle-type structure to overlyingly engage the lowermost side of the slot 41 carried by the tie 35 of the anchor plate 25. The distal end of the leg 59 is rigidly attached to an arcuate bend 71 curving outwardly therefrom into substantially rigid connection with one end of a strut 73 extending away from the arcuate bend 71 substantially perpendicular to the leg 59. The opposite end of the strut 73 is provided with a C-shaped saddle 75 having a lower flange 77 overlying a portion of the strut 73 in substantial parallelism therewith, an upstanding web 79 attached to the end of the flange 77 opposite the distal end of the strut 73, and an upper flange 81 attached to the upper end of the web 79. The saddle 75 is provided for underlying mating engagement with the uppermost end of the slot 41 to provide detachable locking means, in combination with spacing means, to hold a selected tooth of one end of the strap means 43 in substantially rigid engagement with the upstanding side of one of the slots 41 of the anchor plate 25.

Figure 6:
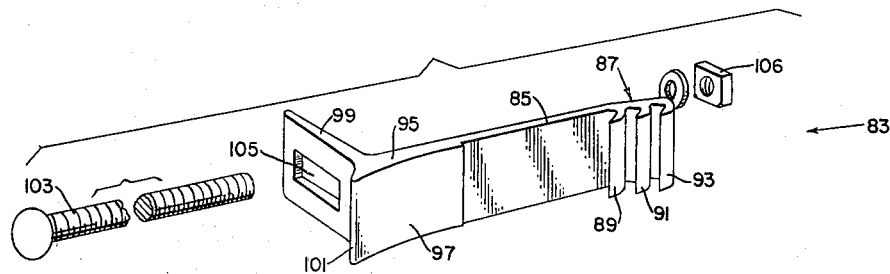
FIG. 6 is an enlarged exploded perspective view of one of the connector links of the device of FIG 1 and attachment means therefor.
Figure 7:
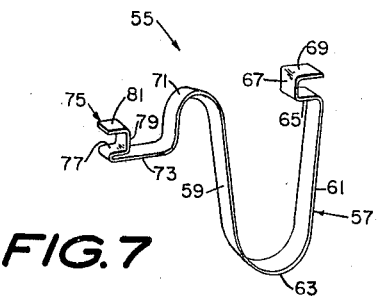
FIG. 7 is an enlarged perspective view of one of the locking clip means of the device of FIG. 1.
Figure 9:
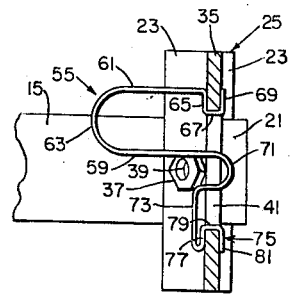
FIG. 9 is an enlarged fragmentary cross sectional view of the device of FIG. 8 as taken on the line IX—IX of FIG. 8.

The equipment support 11 further comprises a pair of link members 83, best illustrated in FIG. 6 of the drawings, each of the link members 83 provided with a shank 85, a toothed body portion 87 having a plurality of hook-like teeth 89, 91, 93, and an abutment plate 95. The abutment plate 95 is provided with a face member 97 arcuately defined for substantial mating abutment with a similarly arcuately defined portion of the circumference of the utility pole P.

The links 83 are additionally provided with tab means 99 attached to the rearmost surface of the abutment plate 95 somewhat inwardly from the end 101 thereof and extending substantially perpendicularly therefrom. The equipment mount 11 further comprises an elongated carriage bolt 103 provided for adjustably connecting the pair of links 83 as by mounting the bolt 103 within a pair of apertures 105 carried by the tabs 99 and threadedly securing the tabs 99 against the bolt 103 and the nut 106.

It will readily be seen upon reference to the aforesaid description and the accompanying drawings that the support 11, comprising the various elements numerically identified herein, provides a substantially girdle-like device for mounting encirclingly upon a selected utility pole P. It will be further seen that the brackets 13 provide mounting means for lightning arrestors 107, insulators, and like electrical devices utilizing the bolt carrying means 17 in combination with bolt means 109 and supporting strap means 111. The present invention is further provided with a ground connector 113 for grounding any electrical leakage from the mount 11 to the ground therebelow through a ground lead (not shown) connected to the ground connector 113 and a suitable fixture in the ground adjacent the base of the utility pole P.

In the use of the device, a selected number of brackets 13 are linkably connected by engaging the like teeth of the strap means 43 with the oppositely spaced inner vertical sides of the slots 41, the selectivity of the teeth determined by the circumference of the utility pole P. The clips 55 are inserted in the slots 41 rearwardly adjacent the teeth of the strap means 43 to maintain the strap means 43 in substantial stable condition therein. A pair of links 83 are affixed to the device in the manner aforedescribed to effect a substantial girdle, said girdle suspendably mounted upon the utility pole P by engaging the bolts 31 with the apertures 29 in the bases 27 of the bracket anchor plates 25. When the equipment support 11 has been attached to the pole P the arrestors 107 may be affixed upon the various brackets 13 circumferentially spaced away from the utility pole P.

We claim:
1. Means for mounting electrical equipment upon a utility pole or the like comprising
 (A) a plurality of bracket means
  (1) disposed at spaced intervals around said pole,
  (2) anchor means attached to said bracket means, including means affixing said anchor means to said pole,
 (B) strap means interconnecting said bracket means,
  (1) said strap means respectively including a plurality of detent like tooth means,
  (2) said anchor means being slotted and said strap means projecting through said slots engaging said teeth with said anchor means,
  (3) clip means holding said tooth means in engagement with said anchor means, projected into said slots and engaging said anchor means adjacent said slots,
 (C) said clip means comprising a flexible member detachably inserted in said slot,
  (1) said clip means being inserted into said slot alongside strap means therein, and being expansive and contractive within said slot adjacent said strap means,
  (2) said clip means adjacent opposite ends thereof including U-bent saddle portions respectively embracing and engaging edge portions of said anchor means adjacent said slots to detachably retain said clip means in position inserted in said slot alongside said strap means,
  (3) said clip means being resilient and urging said saddle portions into anchor means engagement.
2. Means in accordance with claim 1, wherein said bracket means are provided with means for attaching an electrical device thereto.

3. Means in accordance with claim 1, wherein said tooth means carried by said strap means are in axially opposite spaced relation.

4. Means in accordance with claim 1, wherein the means within said anchor means for engaging said tooth means comprises elongate slot means.

5. Means in accordance with claim 1, wherein the means for holding said tooth means in engagement with said anchor means comprises a substantially locking clip.

6. Means in accordance with claim 5, wherein said locking clips are provided with saddle means for overlying detachable engagement with said elongate slot means.

7. Means in accordance with claim 1, wherein the means linkably connecting a pair of said bracket means are provided with arcuate means for mating abutment with said utility pole.

References Cited
UNITED STATES PATENTS

| | | | |
|---|---|---|---|
| 2,366,456 | 1/1945 | Pheazey | 24—73 |
| 2,703,216 | 3/1955 | Petersen | 248—221 X |
| 2,708,087 | 5/1955 | Blackstone | 248—221 |
| 2,761,643 | 9/1956 | Ward et al. | 248—221 X |
| 2,872,139 | 2/1959 | Bedford | 248—27 |
| 2,879,964 | 3/1959 | Anderson et al. | 248—221 |
| 2,910,261 | 10/1959 | Ward et al. | 248—230 |
| 3,374,978 | 3/1968 | Salmon et al. | 248—221 |

EDWARD C. ALLEN, Primary Examiner

J. FRANKLIN FOSS, Assistant Examiner

U.S. Cl. X.R.
174—149; 248—230